(12) United States Patent
Connell et al.

(10) Patent No.: US 7,251,603 B2
(45) Date of Patent: Jul. 31, 2007

(54) AUDIO-ONLY BACKOFF IN AUDIO-VISUAL SPEECH RECOGNITION SYSTEM

(75) Inventors: Jonathan H. Connell, Cortlandt Manor, NY (US); Norman Haas, Mount Kisco, NY (US); Etienne Marcheret, White Plains, NY (US); Chalapathy Venkata Neti, Yorktown Heights, NY (US); Gerasimos Potamianos, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 10/601,350

(22) Filed: Jun. 23, 2003

(65) Prior Publication Data

US 2004/0260554 A1 Dec. 23, 2004

(51) Int. Cl.
*G10L 21/00* (2006.01)
(52) U.S. Cl. .................................... 704/270
(58) Field of Classification Search ............. 704/231, 704/236–240, 251, 255, 270, 276, 275; 382/115, 382/159
See application file for complete search history.

(56) References Cited

U.S. PATENT DOCUMENTS

| | | | |
|---|---|---|---|
| 6,219,640 B1 | 4/2001 | Basu et al. | 704/246 |
| 6,594,629 B1 | 7/2003 | Basu et al. | 704/251 |
| 2002/0116197 A1* | 8/2002 | Erlen | 704/273 |
| 2003/0018475 A1 | 1/2003 | Basu et al. | |
| 2003/0177005 A1* | 9/2003 | Masai et al. | 704/220 |

OTHER PUBLICATIONS

Garg et al, "Frame-dependent multi-stream reliability indicators for audio-visual speech recognition," Proceedings of International Conference on Acoustics, Speech and Signal Processing, ICASSP 2003, vol. 1, Apr. 2003, pp. 24-27.*
G. Potamianos et al., "Hierarchical Discriminant Features for Audio-Visual LVCSR," Proceedings of ICASSP 2001, 4 pages.
C.R. Rao, "Linear Statistical Inference and Its Applications," John Wiley and Sons, New York, pp. 476-490, 1965.
J.R. Deller, Jr. et al., "Discrete-Time Processing of Speech Signals," Prentice Hall, pp. 677-699 and 745-759, 1987.

(Continued)

Primary Examiner—Angela Armstrong
(74) Attorney, Agent, or Firm—Ryan, Mason & Lewis, LLP

(57) ABSTRACT

Techniques for performing audio-visual speech recognition, with improved recognition performance, in a degraded visual environment. For example, in one aspect of the invention, a technique for use in accordance with an audio-visual speech recognition system for improving a recognition performance thereof includes the steps/operations of: (i) selecting between an acoustic-only data model and an acoustic-visual data model based on a condition associated with a visual environment; and (ii) decoding at least a portion of an input spoken utterance using the selected data model. Advantageously, during periods of degraded visual conditions, the audio-visual speech recognition system is able to decode (recognize) input speech data using audio-only data, thus avoiding recognition inaccuracies that may result from performing speech recognition based on acoustic-visual data models and degraded visual data.

22 Claims, 3 Drawing Sheets

OTHER PUBLICATIONS

A. Gersho et al., "Vector Quantization and Signal Compression," Kluwer Academic Publishers, pp. 309-337 and 345-367, 1992.

A. Papoulis, "Probability, Random Variables, and Stochastic Process," McGraw-Hill Publishing Company, pp. 30, 46-48 and 73-74, 1984.

H.L. van Trees, "Detection, Estimation, and Modulation Theory," Part I, John Wiley & Sons, pp. 23-46, 1968.

A. Garg et al., "Frame-Dependent Multi-Stream Reliability Indicators for Audio-Visual Speech Recognition," Proceedings of the International Conference on Acoustics, Speech and Signal Processing, (ICASSP). vol. I, pp. 24-27, Apr. 2003.

A. Rogozan et al., "Adaptive Fusion of Acoustic and Visual Sources for Automatic Speech Recognition," Speech Communication 26, Elsevier Science Publishers, vol. 26, No. 1-2, pp. 149-161, Oct. 1998.

J.H. Connell et al., "A Real-Time Prototype for Small-Vocabulary Audio-Visual ASR," Proceedings of the International Conference on Multimedia and Expo (ICME), vol. II, pp. 469-472, Jul. 2003.

* cited by examiner

AUDIO-ONLY BACKOFF IN AUDIO-VISUAL SPEECH RECOGNITION SYSTEM

FIELD OF THE INVENTION

The present invention relates to techniques for performing speech recognition and, more particularly, to techniques for improving audio-visual speech recognition performance in a degraded visual environment.

BACKGROUND OF THE INVENTION

In an attempt to improve speech recognition performance, it has been proposed to augment the recognition of spoken utterances with the use of visual data. Such visual data, e.g., images of the mouth (lip) region of the speaker, is typically captured (via a camera) contemporaneous with the capture (via a microphone) of the spoken utterances.

In fact, canonical mouth shapes that accompany speech utterances have been categorized, and are known as visual phonemes or "visemes." Visemes can provide information that complements the phonetic stream from the point of view of confusability. By way of example, "mi" and "ni" which are confusable acoustically, especially in noisy situations, are easy to distinguish visually, i.e., in "mi", lips close at onset; whereas in "ni", they do not. By way of further example, the unvoiced fricatives "f" and "s", which are difficult to recognize acoustically, may belong to two different viseme groups. Thus, an audio-visual speech recognition system advantageously utilizes joint audio-visual data models to decode (recognize) input utterances.

However, when implementing an audio-visual speech recognition system, the respective condition of the individual acoustic and visual signals being captured ultimately determines the ability to accurately perform speech recognition. Therefore, in a degraded visual environment, overall speech recognition accuracy may become degraded.

Thus, techniques are needed for improving audio-visual speech recognition performance in a degraded visual environment.

SUMMARY OF THE INVENTION

The present invention provides techniques for performing audio-visual speech recognition, with improved recognition performance, in a degraded visual environment.

For example, in one aspect of the invention, a technique for use in accordance with an audio-visual speech recognition system for improving a recognition performance thereof includes the steps/operations of: (i) selecting between an acoustic-only data model and an acoustic-visual data model based on a condition associated with a visual environment; and (ii) decoding at least a portion of an input spoken utterance using the selected data model.

Model selection may be accomplished by storing the separate acoustic and acoustic-visual models in a manner such that the resulting memory mapped object may be efficiently accessed. For example, this may include use of a contiguous section of memory such that switching between models simply involves shifting pointers to a different base address location.

Advantageously, during periods of degraded visual conditions, the audio-visual speech recognition system is able to decode (recognize) input speech data using audio-only data, thus avoiding recognition inaccuracies that may result from performing speech recognition based on acoustic-visual data models and degraded visual data.

It is to be appreciated that the principles of the invention may be extended to speech recognition systems in general such that model selection (switching) may take place at the frame level (e.g., approximately ten millisecond intervals). Switching may occur between two or more models. By way of example, the invention provides a technique for use in accordance with a speech recognition system for improving a recognition performance thereof, including the steps/operations of selecting for a given frame between a first data model and at least a second data model based on a given condition, and decoding at least a portion of an input spoken utterance for the given frame using the selected data model.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative audio-visual speech recognition implementation. However, it is to be understood that the present invention is not limited to any particular audio-visual speech recognition implementation. Rather, the invention is more generally applicable to any audio-visual speech recognition implementation in which it is desirable to improve recognition performance (e.g., accuracy) by providing for audio-only based decoding when visual data quality degrades.

Figure 1:
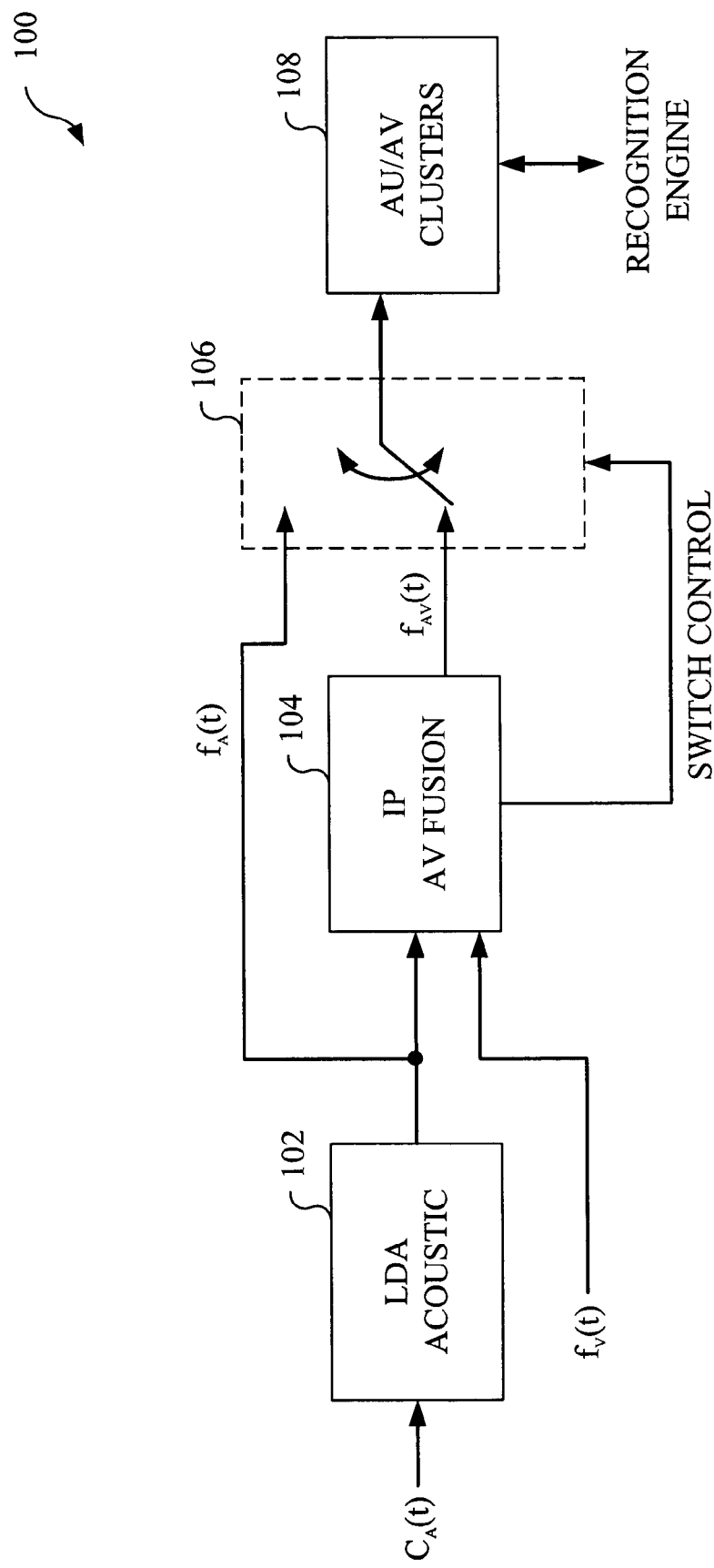
FIG. 1 is a block diagram illustrating portions of an audio-visual speech recognition system, according to an embodiment of the present invention.

Referring initially to FIG. 1, a block diagram illustrates portions of an audio-visual speech recognition system 100, according to an embodiment of the present invention. It is to be understood that FIG. 1 depicts only the functional portions of the audio-visual speech recognition system that readily facilitate an explanation of the present invention. Thus, an audio-visual speech recognition system may include other functional components/elements, however, for the sake of clarity they are not shown or described in detail herein. One of ordinary skill in the speech recognition art will fully realize how to implement the principles of the invention given the descriptions and illustrations provided herein.

By way of example only, principles of the invention may be implemented in accordance with the various audio-visual recognition systems described in the U.S. patent application identified as Ser. No. 09/369,707, filed on Aug. 6, 1999 in the name of S. Basu et al, and entitled "Methods and Apparatus for Audio-Visual Speech Detection and Recognition," and in U.S. Pat. No. 6,219,640, issued on Apr. 17, 2001 to Basu et al., and entitled "Methods and Apparatus for Audio-Visual Speaker Recognition and Utterance Verification," the disclosures of which are incorporated by reference herein. However, as mentioned above, the present invention is not limited to any particular audio-visual recognition implementation.

As shown, FIG. 1 illustrates a linear discriminant analysis (LDA) module 102, an image processing (IP) audio-visual (AV) fusion module 104, a switch module 106, and an acoustic unit (AU)/audio-visual unit (AV) cluster 108.

In general, operation proceeds as follows. Both audio data and video data associated with a spoken utterance are independently captured. As mentioned above, the audio data may be captured by one or more microphones (not shown), while the visual data may be captured by one or more cameras (not shown). The captured audio data signals and the captured visual data signals are then respectively subjected to a process known as feature extraction. Feature extraction for both audio data and visual data is well known in the art, see, e.g., "Hierarchical Discriminant Features For Audio Visual LVCSR," Potamianos, Luettin, Neti, Proceedings of ICASSP 2001, pp. 165-168, the disclosure of which is incorporated by reference herein. The respective processes result in acoustic feature vector (signals) and visual feature vector (signals), which spectrally represent the captured data in given time intervals or frames.

Processing of the acoustic data may also include a technique that accounts for dynamic information associated with the data. This process is known as linear discriminant analysis (LDA) and may include appending a set of preceding and succeeding vectors to the vector under consideration and then projecting the vector to a lower dimensional space, which is chosen to have the most discrimination. LDA is well known in the art, see, e.g., "Linear Statistical Inference and its Applications," C. R. Rao, John Wiley and Sons, New York, 1965, the disclosure of which is incorporated by reference herein. This procedure may be performed in accordance with LDA module 102 of FIG. 1. It is to be understood that other processes may be applied to the audio data and/or the visual data prior to fusion of the audio and visual feature vectors.

IP AV fusion module 104 receives the acoustic feature vectors $f_A(t)$ and the visual feature vectors $f_V(t)$ and merges the vectors together, based on some criterion, to generate merged or fused feature vectors $f_{AV}(t)$. By way of example only, merged feature vectors may be generated for a given time interval by combining acoustic features (e.g., mel cepstra and derivatives) and visual features (e.g., lip shape parameters) associated with the given time interval. It is to be appreciated that various other suitable procedures and criteria may be employed for combining features vectors and, thus, the invention is not intended to be limited to any particular procedure or criterion.

IP AV fusion module 104 also makes a determination as to whether decoding of the spoken utterance will be accomplished using the merged acoustic-visual feature vectors $f_{A,V}(t)$ and acoustic-visual (AV) clusters or model (denoted in FIG. 1 as 108) or, due to a degraded visual environment, using only acoustic feature vectors $f_A(t)$ and acoustic-only (AU) clusters or model (also denoted in FIG. 1 as 108). This determination may be performed using a likelihood ratio test, to be described in detail below.

It is to be understood that the AV and AU clusters or models (108) are previously built based on captured training data; acoustic-visual training data in the case of the AV models, and acoustic training data in the case of the AU models. Creation of AV and AU models based on respective training data is well known in the art, see, e.g., the above-referenced "Hierarchical Discriminant Features For Audio Visual LVCSR," Potamianos, Luettin, Neti, Proceedings of ICASSP 2001, pp. 165-168.

IP AV fusion module 104 also controls a functional switch, i.e., switch module 106, for selecting which cluster (AU or AV) to utilize in the decoding process, for a given time interval, in accordance with the appropriate feature vectors ($f_A(t)$ or $f_{AV}(t)$). Module 104 is able to dynamically switch between models (based on the conditions of the visual environment, for example, as accounted for by the likelihood ratio test) during a given time interval and/or at different time intervals, such that decoding is accomplished with the most reliable data and corresponding models. How the selected feature vectors and models are used to actually decode (recognize) the spoken utterance, in accordance with a speech recognition engine, is well known in the art, see, e.g., "Discrete-Time Processing of Speech Signals," Deller, Proakis and Hansen, Prentice-Hall, 1987, the disclosure of which is incorporated by reference herein. The invention is not limited to any particular recognition technique.

An inventive technique for effectively realizing the functional switch 106 and thus making the selected model efficiently accessible will now be described.

Due to the real time nature of an audio-visual speech recognition system, the invention provides for two types of clusters which may be accessed with a single operating system (OS) kernel object. This is accomplished by packing (storing) the separate acoustic and acoustic-visual models in a manner such that the resulting memory mapped object may be efficiently accessed.

In one illustrative embodiment, one contiguous section of memory is employed, such that switching between acoustic and acoustic-visual models simply involves shifting pointers to a different base address location. Accordingly, the following memory mapped scheme may be used.

Figure 2:
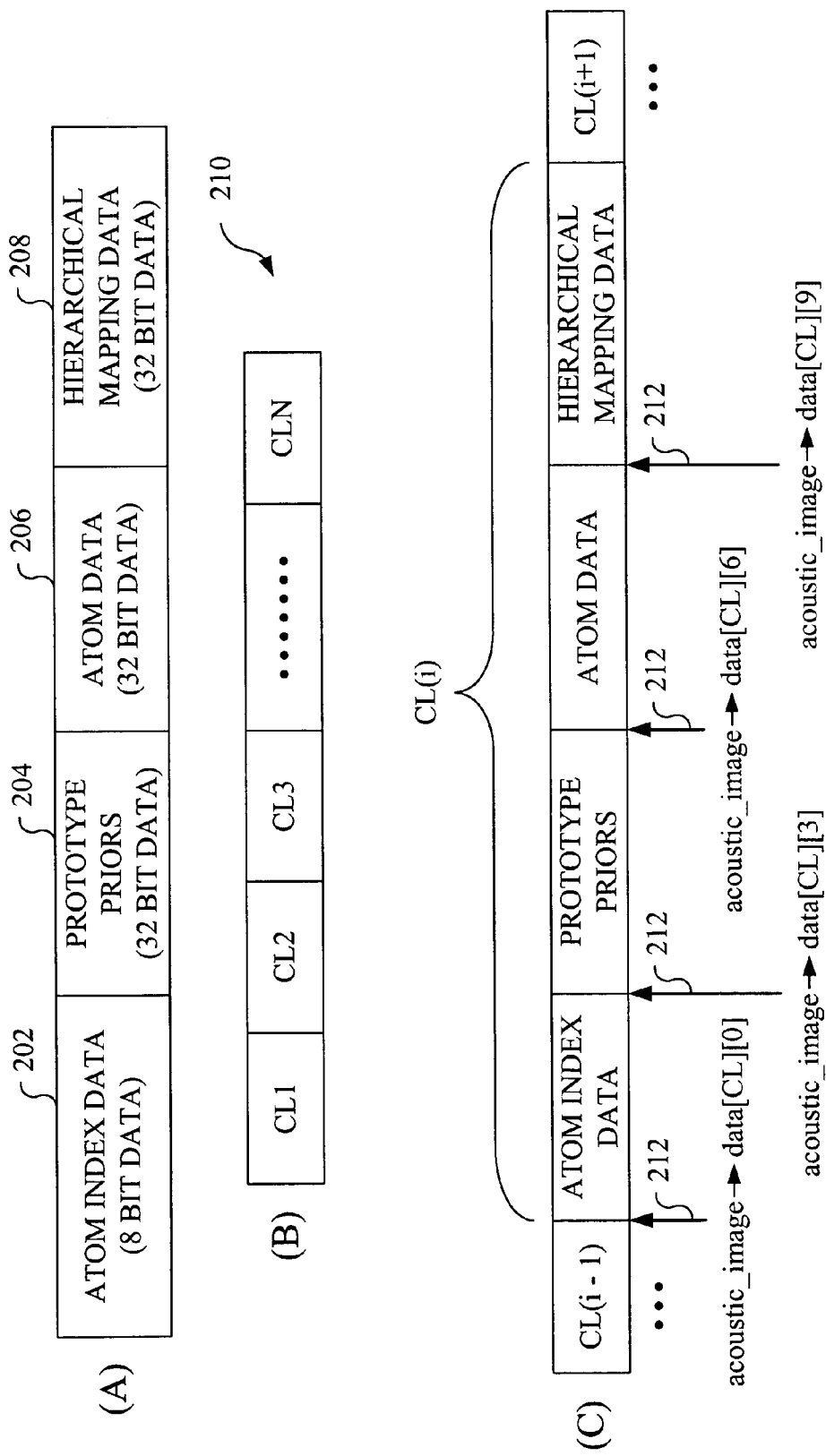
FIGS. 2A through 2C are diagrams illustrating a structure of a generic memory mapped N cluster acoustic model, according to an embodiment of the invention.

Referring now to FIGS. 2A through 2C, diagrams illustrate a structure of a generic memory mapped N cluster acoustic model, according to an embodiment of the invention. More specifically, FIG. 2A illustrates individual cluster data associated with either an acoustic-only (AU) cluster or an acoustic-visual (AV) cluster. The cluster data may include atom index data (e.g., 8 bits) 202, prototype priors (e.g., 32 bit data) 204, atom data (e.g., 32 bit Gaussian acoustic model data) 206, and hierarchical mapping data (e.g., 32 bit data) 208.

Such types of cluster data are well known in the art. In the case of an acoustic model generated from a large mixture of Gaussians (on the order of tens of thousands), the system may use techniques of vector quantization (see, e.g., "Vector Quantization and Signal Compression," Gersho, Gray, Kluwer Academic Publishers, 1992, the disclosure of which is incorporated by reference herein) to efficiently represent these models in quantized space. The atom table data and indices are the quantized versions of the full Gaussian representation. Because of the size of the model (as measured by the number of Gaussians), even with quantized approximations it would not be possible to evaluate all Gaussians at each frame, generally on the order of 10 milliseconds. Hierarchical clustering of these Gaussians allows the system to quickly walk a tree structure and evaluate a small subset of Gaussians with negligible loss in speech decoding accuracy. This hierarchical tree structure is stored in the mapping data. The acoustic modeling outlined here is based on Bayes rule for Gaussian probability computation (see, e.g., "Probability, Random Variables, and Stochastic Processes," Athanasios Papoulis, McGraw-Hill, Publishing Co., 1984, the disclosure of which is incorporated by reference herein), therefore application of Gaussian prior probabilities is required. These prior weights are stored in the prototype prior section.

FIG. 2B illustrates how a shared segment N cluster system may be stored in contiguous memory. FIG. 2C illustrates how a single set of pointers may point to one cluster (e.g., CL(i)) and then be moved as a set to point to another cluster (e.g., CL(i−1) or CL(i+1)), when switching between selected models in accordance with the above-described determination made by IP AV fusion module 104 (FIG. 1).

From such a memory mapping scheme, we have AU=CL1, AV=CL2, with the specifics in the cluster memory mapping as follows:

Atom Index Data:

in_L1=(char*)acoustic_image->data(acoustic_offsets [CL*num_entries+0]);

in_L2=(char*)acoustic_image->data(acoustic_offsets [CL*num_entries+1]);

in_L3=(char*)acoustic_image->data(acoustic_offsets [CL*num_entries+2]);

Prototype Prior Data:

pv_L1=(float*)acoustic_image->data(acoustic_offsets [CL*num_entries+3]);

pv_L2=(float*)acoustic_image->data(acoustic_offsets [CL*num_entries+4]);

pv_L3=(float*)acoustic_image->data(acoustic_offsets [CL*num_entries+5]);

Atom Table Data:

aaa=(float*)acoustic_image->data(acoustic_offsets [CL*num_entries+6]);

bbb=(float*)acoustic_image->data(acoustic_offsets [CL*num_entries+7]);

ccc=(float*)acoustic_image->data(acoustic_offsets [CL*num_entries+8]);

Hierarchical Mapping Data:

L1->L2 mapping m2o_l1_count=(int*)acoustic_image->data(acoustic_offsets[CL*num_entries+9]);

m2o_l1_offset=(int*)acoustic_image->data(acoustic_offsets[CL*num_entries+10]);

L2->L3 mapping m2o_l2_count=(int*)acoustic_image->data(acoustic_offsets[CL*num_entries+11]);

m2o_l2_offset=(int*)acoustic_image->data(acoustic_offsets[CL*num_entries+12]);

L3->leaf mapping:

many2one=(int*)acoustic_image->data(acoustic_offsets [CL*num_entries+13]);

Numerically, we have CL=0 (AU cluster), 1 (AV cluster). In this case, the acoustic_offsets array is a one dimensional integer array of size 2*14=28, and num_entries=14. Thus, access into a new cluster may be done by taking only 14 numbers from this array and using these numbers to change offsets of base pointers (in_L1, int_L2 . . . ); such that the system is pointing into a new cluster. Accessing such a small number of elements of a small array is immediate.

Given the inventive teachings provided herein, one will realize that there are many possible designs for cluster selection. For example, the system may select which cluster to decode from based on the confidence of lip acquisition. Lip acquisition may be achieved from the visual data associated with the mouth region of the speaker captured during real-time recognition. Based on this selection criterion, we now describe an illustrative embodiment.

Cluster control, accomplished by IP AV fusion module 104 (FIG. 1), may be based on a simple binary hypothesis test. The two hypothesis are: acquired lips (H1); or not acquired lips (H0). With hypothesis H0 and H1, a likelihood ratio test, $\Lambda(x)$, may be used with x being one or more independent observations of a visual feature vector (e.g., such feature vectors are extracted from that portion of the image which contains the expected location of the mouth region).

The likelihood ratio test may be represented as:

$$\Lambda(x) = \frac{Pr(x/AV)}{Pr(x/AU)} \lessgtr \eta$$

where cluster selection is based on the value of the calculated $\Lambda(x)$ and a chosen threshold value $\eta$, such that if $\Lambda(x)$ is greater than $\eta$, the system chooses the AV cluster, and if $\Lambda(x)$ is less than $\eta$, the system chooses the AU cluster. The threshold value may be based on the cost of making an error. Based on the distributions determined by probabilities Pr(x/AV) and Pr(x/AU), errors will be made such that x contains a valid mouth region when the observation is classified as no mouth region being present or x does not contain a mouth region when the observation is classified as containing a mouth region.

For robustness reasons, the threshold value may be chosen such that the error of choosing the AV hypothesis when x does not contain the mouth region is minimized. Therefore, the system will only decode against the AV model when there is a level of confidence that valid AV features have been captured. The threshold can be set from the calculated ROC curve (receiver operating characteristic curve, see, e.g., "Detection Estimation and Modulation Theory, Part 1," Harry Van Trees, Wiley Interscience, the disclosure of which is incorporated by reference herein). The setting of the threshold is based on the false alarm probability and detection probability desired. If the prior probabilities on the two hypothesis AU and AV are assumed equal, then a reasonable threshold setting would be 1.0. With specific knowledge about acceptable false alarms to push up detection probability, the threshold may be adjusted from 1.0 in the appropriate direction as dictated by the modeling distributions. The distributions Pr(x/AV) and Pr(x/AU) can be modeled as a mixture of Gaussians.

One illustrative embodiment for the likelihood ratio test threshold may implement the Neyman-Pearson test, see, e.g., the above-referenced "Detection Estimation and Modulation Theory, Part 1," Harry Van Trees, Wiley Interscience. Difficulty in setting realistic costs and a priori probabilities on the acquired lips hypothesis test can be bypassed with the use of conditional probabilities PF (i.e., probability of false alarm; we say that lips are present when the truth is they are not) and PD (probability of detection). We want to minimize PF and maximize PD. The acceptable false alarm rate is ultimately a function of the models. The level of degradation in speech recognition accuracy that occurs when feature vectors are extracted from an image not containing lip region and fused with acoustic-only features need to be taken into account when setting the threshold value.

Thus, with the IP AV fusion module determining the usability of the lip region for enhanced speech recognition, and the efficient structure of clustered acoustics, an audio-visual speech recognition system of the invention is free to switch models at any desired time resolution. The inventive system has the ability to switch between models at the highest resolution observation rate of the system. The observation rate is a function of the acoustic model, and generally is in the 10 to 15 millisecond range.

Due to the nature of the differing models (AU and AV), it is possible that the observation likelihoods will not be directly comparable. In this case, in order to switch at will, normalization is employed. One approach may include the mapping of likelihoods to a normalizing function. Since both the AU and AV models are used to calculate likelihood for the same context dependent phonemes, a simple normalizing structure may include sorting the likelihoods assigned to context dependent phones followed by mapping to an exponential decay function. Once the scores from the models are comparable, the system is free to switch at any time boundary.

It is to be appreciated that the general clustering scheme, as shown and described above in the context of FIGS. 2A through 2C, is not limited to the binary case. As such, the system may have multiple acoustic models within a cluster or clusters. Sub-models may be designed to be a function of the channel (e.g., impulse response of microphone) or speaker characteristic (e.g., gender, speaking rate, emotion). Accordingly, the model normalization and memory mapping described herein permits efficient switching, as needed, down to the smallest resolution measurement of the system, e.g., frame of ten milliseconds.

Figure 3:
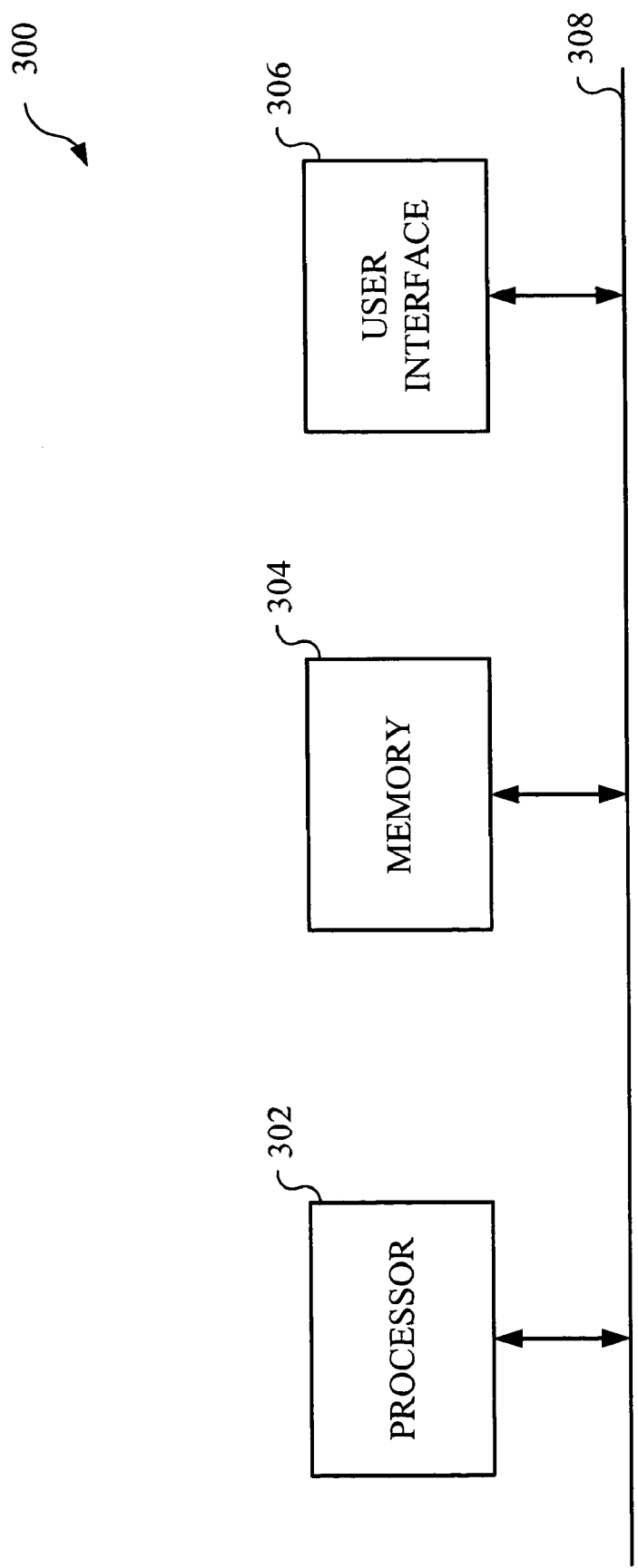
FIG. 3 is a block diagram illustrating a hardware implementation of a computing system in accordance with which components of an audio-visual speech recognition system may be implemented, according to an embodiment of the present invention.

Referring now to FIG. 3, a block diagram illustrates a hardware implementation a computing system 300 in accordance with which components of an audio-visual speech recognition system may be implemented, according to an embodiment of the present invention. In this particular implementation, a processor 302 for controlling and performing the various operations associated with the illustrative system of the invention depicted in FIGS. 1 and 2A through 2C is coupled to a memory 304 and a user interface 306, via a computer bus 308 or alternate connection arrangement.

It is to be appreciated that the term "processor" as used herein is intended to include any processing device, such as, for example, one that includes a CPU (central processing unit) or other processing circuitry. For example, the processor may be a digital signal processor, as is known in the art. Also the term "processor" may refer to more than one individual processor.

The term "memory" as used herein is intended to include memory associated with a processor or CPU, such as, for example, RAM, ROM, a fixed memory device (e.g., hard drive), a removable memory device (e.g., diskette), a flash memory, etc. For example, memory 304 may also be where the memory mapped clusters or models may be stored and accessed.

In addition, the term "user interface" as used herein is intended to include, for example, one or more input devices (e.g., keyboard) for inputting data to the processing unit, and/or one or more output devices (e.g., CRT display and/or printer) for providing results associated with the processing unit. The user interface 306 may also include one or more microphones for receiving user speech, and one or more cameras or sensors for capturing images of the speaker.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIGS. 1 and 2A through 2C may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of using a computer processor to improve speech recognition performance in an audio-visual speech recognition system comprising the steps of:
   receiving audio data and visual data associated with an input spoken utterance;
   using the computer processor to select between an acoustic-only data model and an acoustic-visual data model based on a level of degradation of the visual data; and
   using the computer processor to decode at least a portion of at least one of the audio data and the visual data associated with the input spoken utterance using the selected data model.

2. The method of claim 1, further comprising the step of storing the acoustic-only data model and the acoustic-visual data model in memory such that model selection is made by shifting one or more pointers to one or more memory locations where the selected model is located.

3. The method of claim 1, wherein the model selection step is based on a likelihood ratio test.

4. The method of claim 3, wherein the model selection step further comprises selecting the acoustic-only data model when a result of the likelihood test is not greater than a threshold value.

5. The method of claim 3, wherein the model selection step further comprises selecting the acoustic-visual data model when a result of the likelihood test is not less than a threshold value.

6. The method of claim 5, wherein the threshold value is based on a cost associated with a recognition error.

7. The method of claim 3, wherein the likelihood ratio test is based on one or more observations of a given visual feature.

8. The method of claim 7, wherein the given visual feature is associated with the mouth region of a speaker of the input utterance.

9. The method of claim 1, wherein model selection is performed at a rate substantially equivalent to an observation rate associated with the audio-visual speech recognition system.

10. Apparatus to improve speech recognition performance in an audio-visual speech recognition system the apparatus comprising:

a memory; and at least one processor coupled to the memory and operative to: (i) receive audio data and visual data associated with an input spoken utterance; (ii) select between an acoustic-only data model and an acoustic-visual data model based on a level of degradation of the visual data; and (iii) decode at least a portion of at least one of the audio data and the visual data associated with the input spoken utterance using the selected data model.

11. The apparatus of claim 10, wherein the acoustic-only data model and the acoustic-visual data model are stored in the memory such that model selection is made by shifting one or more pointers to one or more memory locations where the selected model is located.

12. The apparatus of claim 10, wherein the model selection operation is based on a likelihood ratio test.

13. The apparatus of claim 12, wherein the model selection operation further comprises selecting the acoustic-only data model when a result of the likelihood test is not greater than a threshold value.

14. The apparatus of claim 12, wherein the model selection operation further comprises selecting the acoustic-visual data model when a result of the likelihood test is not less than a threshold value.

15. The apparatus of claim 14, wherein the threshold value is based on a cost associated with a recognition error.

16. The apparatus of claim 12, wherein the likelihood ratio test is based on one or more observations of a given visual feature.

17. The apparatus of claim 16, wherein the given visual feature is associated with the mouth region of a speaker of the input utterance.

18. The apparatus of claim 10, wherein model selection is performed at a rate substantially equivalent to an observation rate associated with the audio-visual speech recognition system.

19. An article of manufacture for use with a computer processor to improve speech recognition performance in an audio-visual speech recognition system, comprising a machine readable medium containing one or more programs which when executed implement the steps of:

receiving audio data and visual data associated with an input spoken utterance;

using the computer processor to select between an acoustic-only data model and an acoustic-visual data model based on a level of degradation of the visual data; and using the computer processor to decode at least a portion of at least one of the audio data and the visual data associated with the an input spoken utterance using the selected data model.

20. The article of claim 19, further comprising the step of storing the acoustic-only data model and the acoustic-visual data model in memory such that model selection is made by shifting one or more pointers to one or more memory locations where the selected model is located.

21. An audio-visual speech recognition system, comprising:

a memory; and at least one processor coupled to the memory and operative to: (i) receive audio data and visual data associated with an input spoken utterance; (ii) select between an acoustic-only data model and an acoustic-visual data model based on a level of degradation of the visual data; and (iii) decode at least a portion of at least one of the audio data and the visual data associated with the input spoken utterance using the selected data model, wherein the acoustic-only data model and the acoustic-visual data model are stored in the memory such that model selection is made by shifting one or more pointers to one or more memory locations where the selected model is located.

22. A method of using a computer processor to improve speech recognition performance in a speech recognition system comprising the steps of:

receiving one or more frames of audio data and visual data associated with an input spoken utterance;

using the computer processor to select for a given frame between a first data model and at least a second data model based on a level of degradation of the visual data; and using the computer processor to decode at least a portion of at least one of the audio data and the visual data associated with the input spoken utterance for the given frame using the selected data model.

* * * * *